United States Patent
Hamdan et al.

(10) Patent No.: US 8,308,441 B2
(45) Date of Patent: Nov. 13, 2012

(54) ROBUST PID CONTROL FOR BLDC MOTOR CONTROLLER

(75) Inventors: Marv M. Hamdan, North Olmsted, OH (US); David J. Pfefferl, Broadview Heights, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 995 days.

(21) Appl. No.: 12/261,568

(22) Filed: Oct. 30, 2008

(65) Prior Publication Data
US 2010/0111707 A1    May 6, 2010

(51) Int. Cl.
F04B 49/06    (2006.01)
H02P 7/28    (2006.01)
G05B 13/02    (2006.01)
(52) U.S. Cl. .................... 417/44.1; 318/268; 700/42
(58) Field of Classification Search .............. 417/44, 417/212–212
See application file for complete search history.

(56) References Cited

U.S. PATENT DOCUMENTS

| | | | |
|---|---|---|---|
| 5,357,421 A * | 10/1994 | Tautz et al. ................. | 700/4 |
| 7,113,834 B2 | 9/2006 | Wojsznis et al. | |
| 7,212,421 B2 | 5/2007 | Chandra et al. | |
| 2005/0044873 A1 * | 3/2005 | Tamai et al. ................ | 62/323.1 |
| 2007/0230925 A1 | 10/2007 | Hwang | |
| 2007/0274115 A1 | 11/2007 | Michaels et al. | |
| 2008/0175717 A1 * | 7/2008 | Schnetzka et al. ........... | 417/3 |

FOREIGN PATENT DOCUMENTS

| | | |
|---|---|---|
| DE | 10346555 A1 | 7/2004 |
| DE | 102004003153 A1 | 8/2004 |
| EP | 0554479 A1 | 8/1993 |

OTHER PUBLICATIONS

German Search Report dated Jan. 8, 2011 (6 pgs.).

* cited by examiner

Primary Examiner — Tracie Y Green
(74) Attorney, Agent, or Firm — Fay Sharpe LLP

(57) ABSTRACT

When controlling an air compressor (13) for a pneumatic braking system on a large hybrid commercial vehicle (e.g., a bus, a package delivery truck, etc.), PID control of an air compressor motor (12) is employed during normal system operation such as when the motor shaft is spinning, and state machine control is employed during startup or upon a system disturbance such as a shaft seizure or stall. In this manner, stalling events that occurs due to PID control inability to correct for unexpected disturbances are mitigated by employing state machine control.

18 Claims, 6 Drawing Sheets

ROBUST PID CONTROL FOR BLDC MOTOR CONTROLLER

BACKGROUND

The present application finds particular application in commercial vehicle systems, particularly involving motor control in hybrid commercial vehicles. However, it will be appreciated that the described technique may also find application in other motor control systems, other commercial vehicle systems, or other hybrid vehicle systems.

Proportional-integral-derivative (PID) controllers typically comprise a control loop feedback mechanism and are used in control systems (e.g., industrial control systems, automotive control systems, etc.). A PID controller iteratively adjusts one or more parameters (e.g., current, voltage, etc.) to correctly minimize a difference (e.g., error) between a measured process variable and a desired setpoint by determining a corrective action that adjusts the process. Determining the corrective action involves calculating three separate parameter values for the measured error: proportional, integral, and derivative values. The proportional value is used to determine an appropriate reaction to the current error, the integral value is used to determine an appropriate reaction based on the sum of recent errors, and the derivative value is used to determine an appropriate reaction based on the rate at which the error has been changing. The weighted sum of these three values is used to adjust the process via a control element (e.g., a current or voltage source, a valve, etc.).

By tuning the three constants in the PID controller algorithm, a controller can provide a control mechanism tailored for specific process requirements. The response of the controller can be described in terms of the responsiveness of the controller to an error, the degree to which the controller overshoots the setpoint, and/or the degree of system oscillation. However, the use of the PID algorithm for control does not guarantee optimal control of the system or system stability, and cannot account for unexpected system disturbances (e.g., motor stall, short circuit, etc.).

Not all applications require all three control variables or modes, but rather some applications may use only one or two modes to provide the desired system control. This is achieved by setting the gain of undesired control output(s) to zero. For example, if the derivative gain is set to zero, then the PID controller becomes a PI controller. PI controllers are particularly common, since derivative action is very sensitive to measurement noise, and since the absence of an integral value can prevent the system from reaching its target value due to the control action.

PID controllers are used in the automotive industry to control various systems. A major drawback of PID controllers is that they are typically effective only over a relatively narrow range of system parameters. Despite tuning improvements such as pole placement, fuzzy logic, auto-tuning, gain scheduling, adaptation, etc., PID controllers remain less than optimal when employed to control a motor or system over a wide range of operating parameters. Attempts to adapt a PID controller over wide ranges of system parameters or variables result in suboptimal performance.

The present application provides new and improved motor control systems and methods for hybrid commercial vehicles, which overcome the above-referenced problems and others.

SUMMARY

In accordance with one aspect, a system for controlling an air compressor in a hybrid commercial vehicle includes a low-voltage (LV) controller having a PID controller that controls an air compressor motor during normal operation and a state machine controller that controls the air compressor motor during startup and upon external system disturbances. The system further includes a high-voltage driver board that receives one or more control signals from the LV controller and drives a bridge network to control current provided to the air compressor motor, thereby controlling operation thereof. Additionally, the system includes one or more sensors that measure at least one parameter of the air compressor motor and provide feedback information to the LV controller.

In accordance with another aspect, a method of controlling an accessory motor in a hybrid vehicle includes determining whether a motor shaft is in an operational spinning state using one or more sensors, employing proportional-integral-derivative (PID) control to control a speed of the motor shaft when the motor shaft is in the operational spinning state, and employing state machine control to control the speed of the motor shaft when the motor shaft is not in the operational spinning state.

In accordance with another aspect, an apparatus that facilitates controlling a screw-type air compressor in a hybrid commercial vehicle includes means for compressing air to pneumatically operate the braking system, and means for providing power to the means for compressing air. The apparatus further includes means for providing proportional-integral-derivative (PID) control of the means for providing power during operation of the means for compressing air, and for providing state machine control of the means for providing power during startup of the means for providing power and during external system disturbances. Additionally, the apparatus includes means for sensing at least one parameter of the means for providing power and providing feedback information describing the at least one parameter.

One advantage is that unexpected system disturbances trigger state machine control.

Another advantage resides in using PID control where it is most effective and switching to state machine control when PID control is ineffective.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

Systems and methods are described herein that combine state-machine control with PID control to provide robust control over dynamic load disturbance and sudden system changes. According to one feature, PID control is employed only when a motor is in a spinning state to avoid a stall condition, and state-machine control is used otherwise. This feature facilitates providing reliable motor control of, for example, an electric compressor motor across all motor states and/or conditions. By employing PID control only during a spinning state, other system perturbations can be controlled via the state machine. The combination of the two methods during different states provides robust control and enables a smooth current increase, or "kick," between states, which in turn facilitates mitigating or eliminating large mechanical shock(s) to system components. The systems and methods described herein have particular applicability for air compressors used in braking systems on large hybrid commercial vehicles that start and stop frequently, such as buses, refuse collection vehicles, package delivery vehicles, construction vehicles (e.g., dump trucks), and the like.

Figure 1:
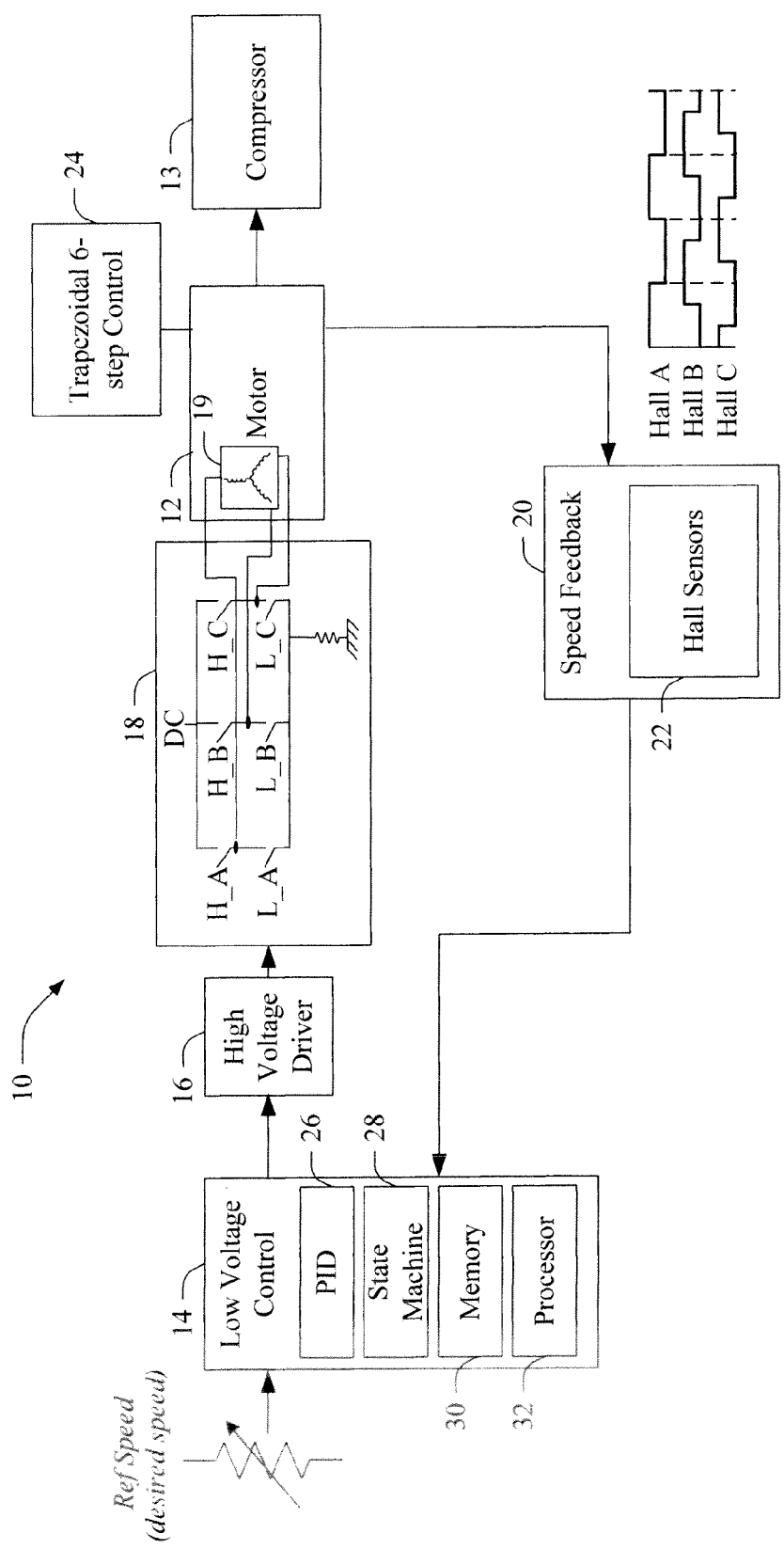
FIG. 1 illustrates a system for implementing robust PID control for a compressor motor in a hybrid commercial vehicle, including a low-voltage (LV) control board (e.g., a motor control board) and a high-voltage (HV) driver board that control a bridge network to energize windings in the motor.

FIG. 1 illustrates a system 10 for implementing robust PID control for a motor 12 coupled to a compressor 13 in a hybrid commercial vehicle, including a low-voltage (LV) control board 14 (e.g., a motor control board) and a high-voltage (HV) driver board 16 that control a bridge network 18 to energize windings 19 in the motor. According to one example, the LV control board is a 12V board and the HV driver board has a voltage of approximately 320V-640V. In another embodiment, the compressor 13 is a screw-type air compressor. A desired speed input or command is provided to the LV control board, and compressor motor shaft rotation speed is monitored to provide speed feedback 20 to the LV control board to control the motor. For instance, one or more Hall sensors 22 can be employed to monitor motor shaft speed. In other examples, the speed feedback 20 is generated by one or more encoders, one or more resolvers (e.g., a rotary electrical transformer used for measuring degrees of rotation), or some other suitable sensor. Still furthermore, in one embodiment the sensorless feedback is generated, e.g., by measuring the back EMF in undriven coils to infer shaft position, etc. Optionally, a trapezoidal 6-step control component 24 (e.g., 6-step commutation) can be employed to drive the compressor motor when building air compression. In one embodiment, the compressor motor is a brushless direct current (BLCD) motor.

The system 10 facilitates mitigating undesirable parasitic losses in the motor 12. Speed feedback information 20 from the Hall sensor(s) 22 is provided to the LV control board 14, which adjusts a duty cycle of the switches H_A, H_B, H_C, L_A, L_B, L_C based on the feedback information 20. During periods of normal motor operation, the LV control board 14 employs a PID controller 26 to control motor operation. However, the LV control board employs a state machine controller 28 upon the occurrence of a triggering event, such as the motor starting or stopping, a sudden load change (e.g., a mechanical malfunction or damaged mechanical component), etc. The state machine controller 28 and the PID controller 26 can be stored to persistent memory 30 in or on the LV control board, for instance, as one or more sets of machine-executable instructions that are executed by a processor 32. In this manner, the system 10 facilitates preventing a stall condition in the compressor motor, which can occur when the compressor is cold, during frequent starts and stops, upon a mechanical failure, etc.

In one embodiment, the system uses interrupts to detect state changes (e.g., spinning or not spinning). In another embodiment, a miswire detector (not shown) is provided to ensure that the 3-phase air compressor motor is properly wired, which in turn facilitates proper state machine operation.

In another embodiment, the high-voltage driver board provides approximately 320V at 18 A to the bridge network.

In yet another embodiment, motor and/or compressor disturbance (e.g., shaft seizures, motor stalls, etc.) information is stored to the memory 30 to facilitate failure prediction or the like. For instance, information describing a number and frequency of system disturbances (e.g., as determined from speed feedback information 20 is stored to the memory 30. In one embodiment, the disturbance number and frequency information is stored as a histogram. The processor 32 analyzes the disturbance information to diagnose one or more of motor behavior and compressor behavior. Based on the analysis, the processor identifies potential failure conditions in one or both of the motor 12 and the compressor 13.

In another embodiment, the processor communicates potential failure information to a user. For instance, the processor may determine from the disturbance information that the motor is cycling between two states, and that a failure condition is imminent. The processor then triggers an alert message or indicator signal (e.g., a "service required" light or some other suitable indicator) to alert a user to the potential failure condition. In another embodiment, if the processor detects that a number and/or frequency of disturbances has exceeded a predetermined threshold number or frequency, respectively, then the processor generates and/or transmits a signal or indication to the user that a failure condition may be imminent.

Figure 2:
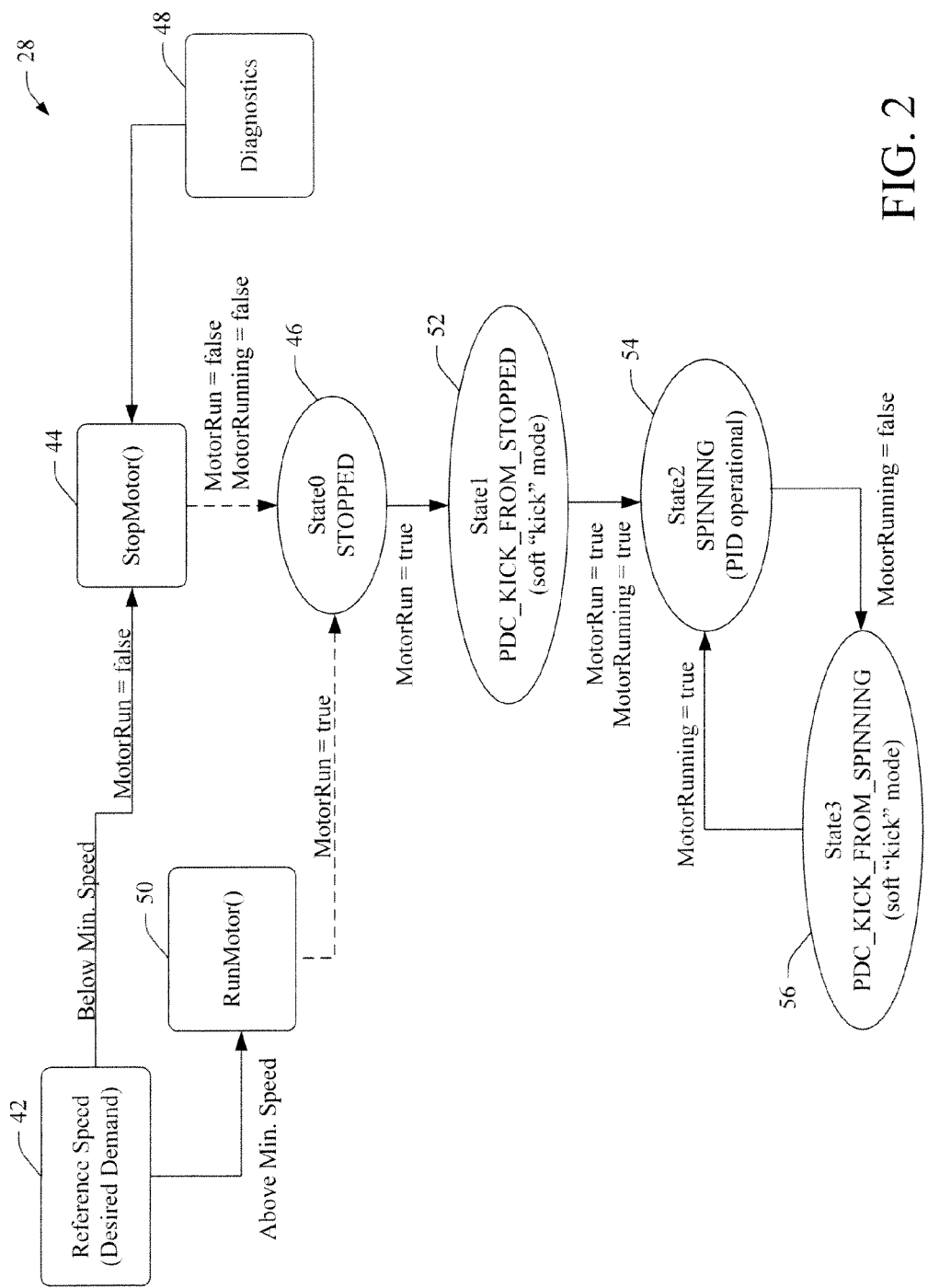
FIG. 2 illustrates the state machine controller, including a plurality of motor states that are controlled thereby.

FIG. 2 illustrates the state machine controller 28, including a plurality of motor states that are controlled thereby. An input or reference motor speed 42 is determined, input, or received (e.g., by a processor or the like. If the reference speed is less than a minimum operational speed of the motor, then a MotorRun condition is determined to be false and a StopMotor command 44 is issued to the motor to ensure that it is not running and/or does not attempt to run at the below-minimum speed. The StopMotor command causes both a MotorRun condition and a MotorRunning condition to be false, which in turn permits a determination that the motor is in a STOPPED state (state0) 46. In some scenarios, a set of diagnostic instructions 48 is executed to determine whether a fault condition is present at the motor.

If the reference speed is greater than the minimum allowable motor speed, then a MotorRun command is issued causing a MotorRun condition to be true (e.g., the motor is told to spin). The STOPPED state 50 of the motor is evaluated, and, since the MotorRun condition is true, a determination is made that the motor is in a second state (state1) 52 in which the motor is in soft "kick mode (e.g., soft-transition mode). In state1 (also referred to as PDC_KICK_FROM_STOPPED, or STARTUP), the compressor motor is starting up from a stopped state (e.g., state0).

If the MotorRun condition and the MotorRunning condition are both true, then a determination is made that the motor is in a third state (state2) 54, in which the motor is spinning. If the MotorRunning condition becomes false after the motor has been determined to be in State2, then the motor is determined to be in a fourth state (state3) 56 (e.g., a soft-kick mode or PDC_KICK_FROM_SPINNING) in which the motor is in a transition from a spinning state to a non-spinning state. If the MotorRunning condition becomes true again, then the motor is determined to be in the SPINNING state again (e.g., state2).

Figure 3:
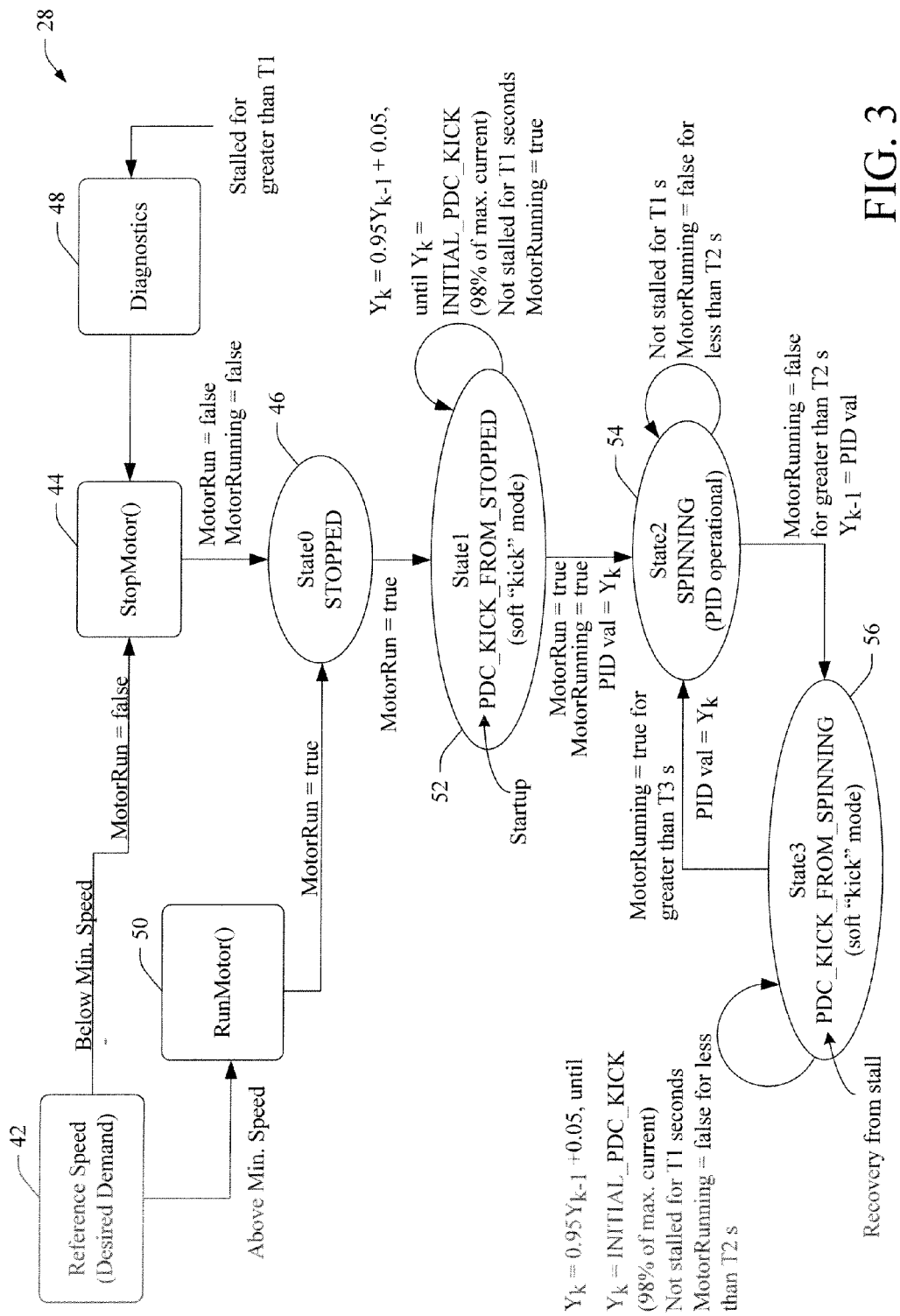
FIG. 3 shows another embodiment of the state machine, including examples of state transition conditions or criteria that are evaluated and/or controlled to assess and/or manipulate transitions of the motor between states.

FIG. 3 shows another embodiment of the state machine 28, including examples of state transition conditions or criteria that are evaluated and/or controlled to assess and/or manipulate transitions of the motor between states. For instance, the diagnostic instructions 46 may be executed after a determination that the motor has been in a stalled state for a first predetermined time period T1 (e.g., 2 seconds, 5 seconds, 6 seconds, 10 seconds, etc.).

In another example, the motor remains in state1 (e.g., startup/ramp mode, or a transition from the stopped state0), as long as the following conditions are true: a reference or control output signal $Y_k$ is set to $0.95Y_{k-1}+0.05$, until $Y_k$ is equal to INITIAL_PDC_KICK value (e.g., approximately 98% of maximum current, or some other predetermined value thereof); the motor has not stalled for T1 seconds; and the MotorRunning condition has been true for at least a second predetermined time period T2 (e.g., 0.5 seconds or some other predetermined time value).

If MotorRunning is true and MotorRun is true, then the PID value is set equal to $Y_k$ and the motor transitions from state1 (startup) to state2 (SPINNING), in which the PID is operational to control the motor. The motor remains in state2 as long as the following conditions are true: the motor is not stalled for time period T1, and the MotorRunning condition is false for less than time period T2. If the motor is stalled for a time period greater than T1, then the diagnostics instructions 48 are executed. If the MotorRunning condition is false for a time period greater than T2, then $Y_{k-1}$ is equal to the PID value, and the motor transitions to state3.

The motor remains in state3 (e.g., transition from spinning) as long as the following conditions are true. Then, $Y_k=0.95Y_{k-1}+0.05$, until $Y_k$ is equal to the INITIAL_PDC_Kick value; the motor is not stalled for a time period equal to or greater than T1; and the MotorRunning condition is false. Once the Motor Running condition is true for a time period greater than T3 (e.g., 300 ms, 500 ms, 1 s, or some other predetermined time period), then the PID value is equal to $Y_k$, the motor returns to state2 (SPINNING), and the PID controller takes over control of the motor.

Figure 4:
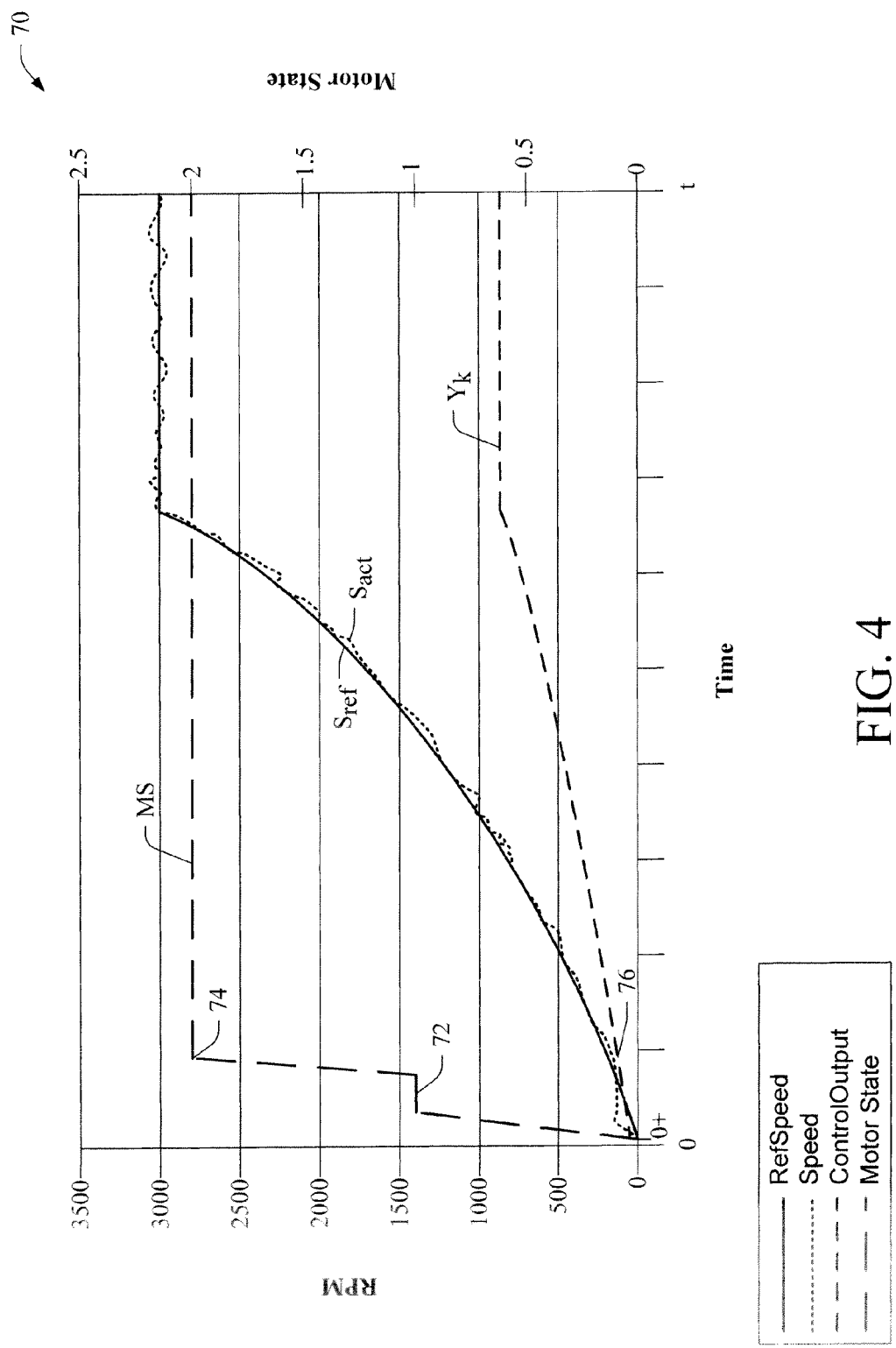
FIG. 4 illustrates a graph showing relationships between motor speed (RPM), time, and motor state during the state machine transition from state0 (STOPPED) through state1 (STARTUP) to state2 (SPINNING) during normal operation.

FIG. 4 illustrates a graph 70 showing relationships between motor speed (RPM), time, and motor state during the state machine transition from state0 (STOPPED) through state1 (STARTUP) to state2 (SPINNING) during normal operation. Reference speed $S_{ref}$ is shown as a solid line that increases from time 0+ (startup time) to a steady state speed of 3000 rpm. Actual motor speed $S_{act}$ (e.g., as measured by the Hall sensors of FIG. 1, or some other suitable sensor(s)) is shown as a dotted line that closely follows the reference speed line. Control output $Y_k$ is illustrated as a short-dashed line, and motor state MS is shown as a long-hashed line.

The motor transitions from state0 (STOPPED) to state1 (STARTUP) at 72, after receiving a MotorRun command and after the MotorRunning condition becomes true. The motor transitions to state2 (SPINNING) at 74, after the MotorRunning condition has become true. During the transitions, the state machine controller controls the motor. Once the motor is in state2 (SPINNING), the PID controller takes over and continues to control the motor speed unless or until another state transition occurs. The switch to PID control is illustrated at 76 on the control output line, which increases proportionally to the reference speed line until the control output stabilizes when reference speed reaches steady state.

Figure 5:
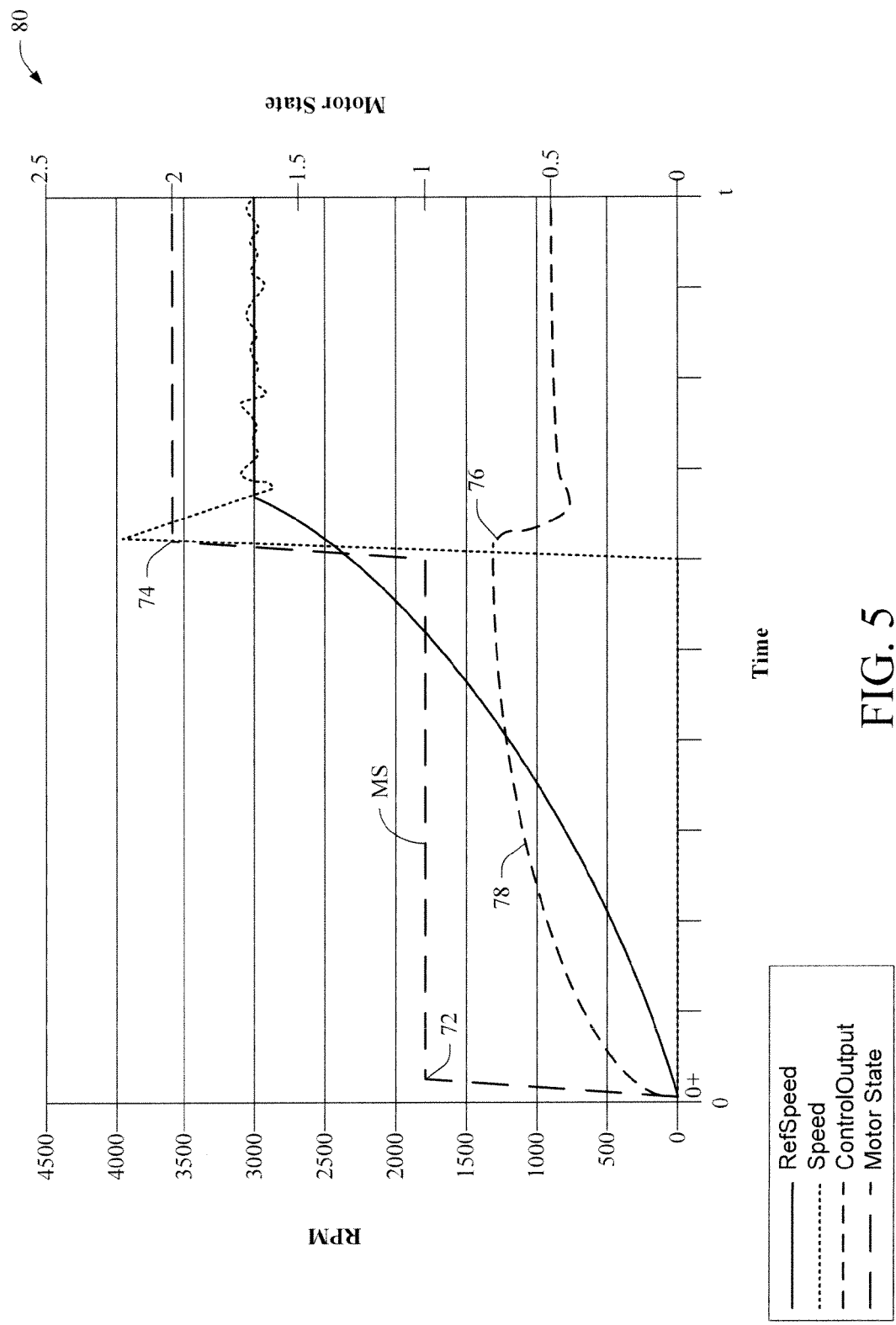
FIG. 5 illustrates a graph showing relationships between motor speed (RPM), time, and motor state during the state machine transition from state0 (STOPPED) through state1 (STARTUP) to state2 (SPINNING) when the compressor motor is at a standstill while attempting to turn with a seized shaft.

FIG. 5 illustrates a graph 80 showing relationships between motor speed (RPM), time, and motor state during the state machine transition from state0 (STOPPED) through state1 (STARTUP) to state2 (SPINNING) when the motor is at a standstill while attempting to turn with a seized shaft. Beginning at time 0+, the motor transitions from state0 (STOPPED) to state1 (STARTUP) at 72, during which time state machine control is exerted over the motor. Because the motor shaft that drives the compressor is seized, the motor remains in state1 and under state machine control 78. When the shaft is freed (e.g., due to the execution of a diagnostics routine, warming of the compressor, or other removal of the seizing condition), the motor transitions to state2 (SPINNING) at 74. PID control takes over at 76, contemporaneously with the motor transition to the spinning state. PID control is delayed while motor current is gradually increased by the state machine controller to ensure a smooth "kick" or transition until the shaft begins to spin. In this manner, the motor transitions from state0 through state1 to state2 despite an initial disturbance.

Figure 6:
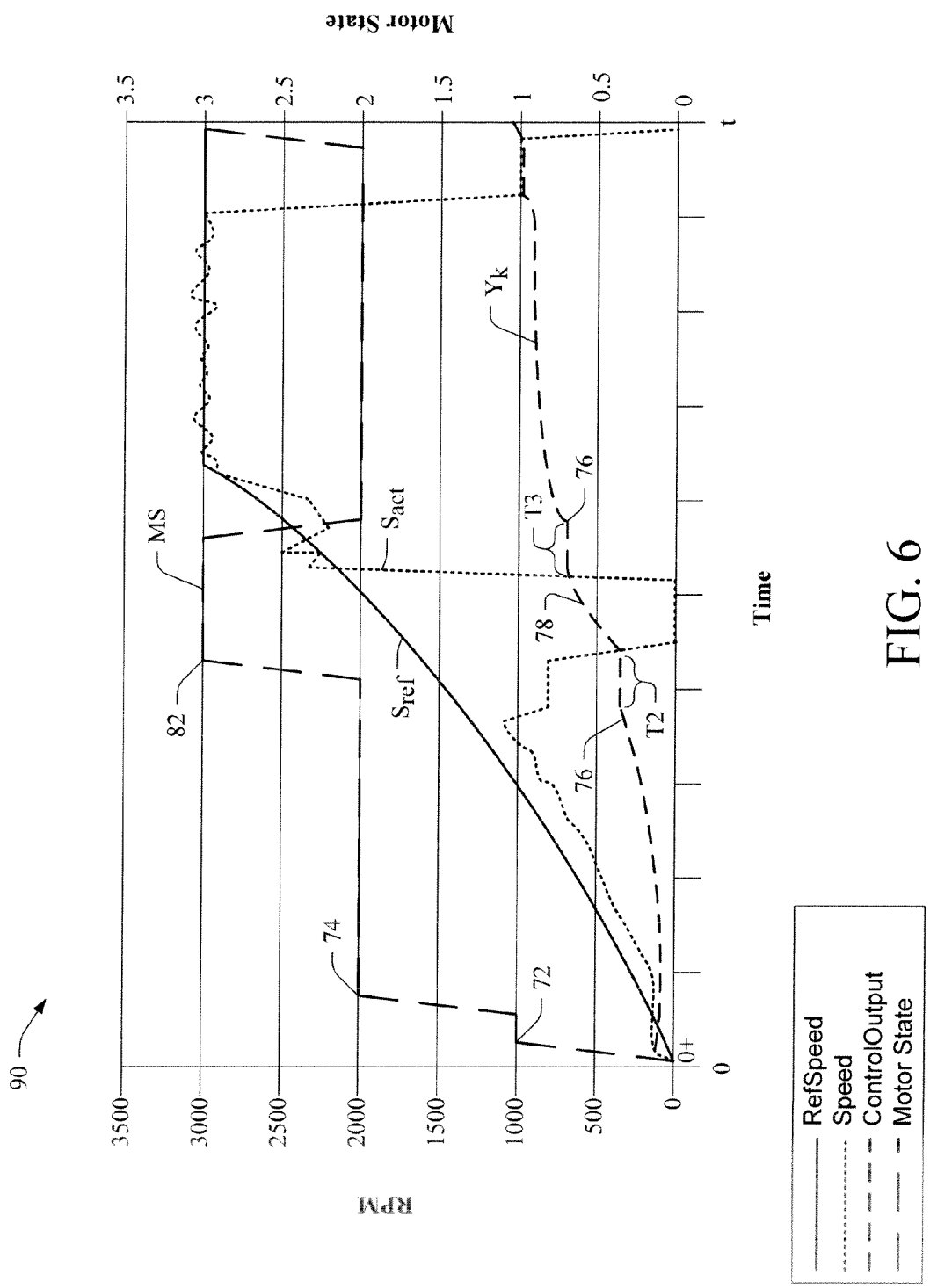
FIG. 6 illustrates a graph showing relationships between motor speed (RPM), time, and motor state during the state machine transition between state2 (SPINNING) and state3 (Recovery-from-Stall) when the compressor motor is spinning and then suddenly seizes.

FIG. 6 illustrates a graph 90 showing relationships between motor speed (RPM), time, and motor state during the state machine transition between state2 (SPINNING) and state3 (soft transition) when the compressor motor is spinning and then suddenly seizes. At time 0+, the motor shaft begins to spin as the motor transitions from state0 (STOPPED) through state1 (STARTUP), shown at 72, to state2 (SPINNING) at 74. The control output $Y_k$ is under PID control 76 until the disturbance (e.g., seized shaft) is detected, at which time state machine control 78 takes over. For instance, upon initial detection of the disturbance, PID control is maintained for time period T2 (e.g., 0.5 seconds or some other predetermined time) to verify a stall condition. Once the stall condition is verified, PID control is suspended and state3 is entered, at 82, for smooth current increase or "kick." State3 is exited once shaft rotation has been confirmed for a time period equal to T3. Once shaft rotation has been confirmed, state2 is reentered and PID control resumes. In this manner, the motor transitions from state0, through state1 and state2 to state3, and back to state2.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A system for controlling an air compressor in a hybrid commercial vehicle, including:
   a low-voltage (LV) controller having a PID controller that controls an air compressor motor during normal operation and a state machine controller that controls the air compressor motor during startup and upon external system disturbances;
   a high-voltage driver board that receives one or more control signals from the LV controller and drives a bridge network to control current provided to the air compressor motor, thereby controlling operation thereof; and one or more sensors that measure at least one parameter of the air compressor motor and provide feedback information to the LV controller.

2. The system according to claim 1, wherein the air compressor includes a screw-type air compressor that compresses air for a braking system in a commercial vehicle, and the at least one parameter is a rotational speed of a drive shaft of a motor for driving the screw-type compressor.

3. The system according to claim 1, wherein the LV controller enters a diagnostic mode if the motor shaft is not spinning after the expiration of a first predetermined time period.

4. The system according to claim 1, wherein the state machine controller controls the air compressor motor during a transition between a stopped state, a startup state, and spinning state, and wherein the PID controller controls the air compressor motor during the spinning state.

5. The system according to claim 4, wherein the state machine controller resumes control of the air compressor motor upon a triggering event, and maintains control of the air compressor motor until the air compressor re-enters the spinning state.

6. The system according to claim 5, wherein the LV controller delays a switch from the spinning state to a recover-from-stall state for a second predetermined time period to verify the occurrence of the triggering event.

7. The system according to claim 6, wherein the second predetermined time period has a duration of approximately 100 ms to 1 second.

8. The system according to claim 5, wherein the LV controller delays a switch from a recovery-from-stall state to a spinning state for a third predetermined time period to verify that the air compressor motor has re-entered the spinning state and the triggering event is no longer present.

9. The system according to claim 8, wherein the third predetermined time period has a duration of approximately 100 ms to 1 second.

10. The system according to claim 5, wherein the triggering event is a seizure of a motor shaft.

11. The system according to claim 1, wherein the one or more sensors include one or more Hall sensors, one or more encoders, or one or more resolvers.

12. The system according to claim 1, wherein the LV controller operates at a predetermined target vehicle system voltage.

13. A method for controlling an accessory motor in a hybrid vehicle, including:
determining whether a motor shaft is in an operational spinning state using one or more sensors;
employing proportional-integral-derivative (PID) control to control a speed of the motor shaft when the motor shaft is in the operational spinning state; and
employing state machine control to control the speed of the motor shaft when the motor shaft is not in the operational spinning state.

14. The method according to claim 13, wherein the accessory includes an air compressor.

15. The method according to claim 13, further including delaying a transition between a spinning state and a recover-from-stall state for a first predetermined time period to verify the presence of a triggering condition that triggers the transition.

16. The method according to claim 14, further including delaying a transition from a recovery-from-stall state to a spinning state for a second predetermined time period to verify that the triggering condition is no longer present.

17. A processor or computer-readable medium programmed to perform the method of claim 13.

18. The system according to claim 1, further comprising:
a memory that stores disturbance information describing a number and frequency of system disturbances; and
a processor that analyzes disturbance information to diagnose one or more of motor behavior and compressor behavior, identifies potential failure conditions in one or more of the motor and the compressor, and communicates potential failure information to a user.

* * * * *